United States Patent [19]

Brison

[11] 4,405,998

[45] Sep. 20, 1983

[54] DOMESTIC MIXER

[75] Inventor: Marc P. Brison, Saint-Lo, France

[73] Assignee: Moulinex, Societe Anonyme, Bagnolet, France

[21] Appl. No.: 433,696

[22] Filed: Oct. 12, 1982

[30] Foreign Application Priority Data

Oct. 28, 1981 [FR] France .................................. 81 20209

[51] Int. Cl.³ .............................................. B01F 7/26
[52] U.S. Cl. .................................... 366/264; 366/343; 416/133
[58] Field of Search ............... 366/129, 262, 263, 264, 366/265, 266, 270, 343, 279; 416/133

[56] References Cited

U.S. PATENT DOCUMENTS

| 2,583,369 | 1/1952 | Fumagalli | 416/133 X |
| 2,806,239 | 9/1957 | Wittnebert | 366/343 X |
| 2,826,401 | 3/1958 | Peters | 366/279 X |
| 3,632,227 | 1/1972 | Love | 366/264 X |
| 3,724,765 | 4/1973 | Rohrbaugh et al. | 366/264 X |

Primary Examiner—Robert W. Jenkins
Assistant Examiner—Arthur D. Dahlberg
Attorney, Agent, or Firm—Young & Thompson

[57] ABSTRACT

A mixer arranged for crushing food materials immersed in a liquid comprises a motor unit and a mixing foot. A shaft extends within the mixing foot and is coupled at one end to the motor unit. At its other end the shaft carries a mixing screw which is housed in a cover carried by said mixing foot. The mixing screw is movable between a safety position, in which it is located in the cover, and a mixing position, in which it projects outwardly of the cover. The mixing screw is moved into its mixing position against the action of elastic restoring means by a force resulting from the screwing effect in the liquid.

5 Claims, 2 Drawing Figures

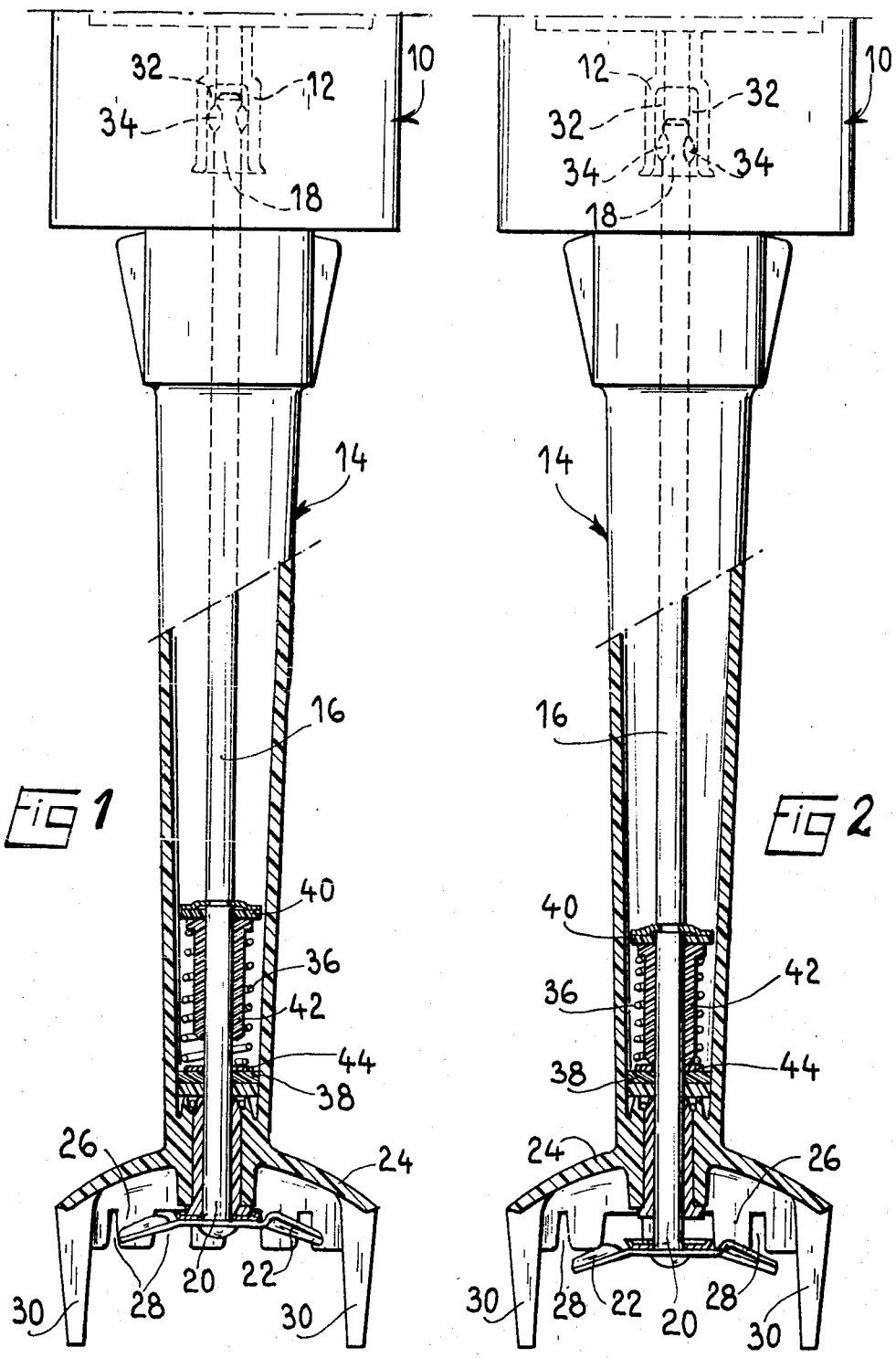

DOMESTIC MIXER

BACKGROUND OF THE INVENTION

The invention relates to domestic mixers intended especially for crushing food materials immersed in a liquid.

A known domestic mixer comprises a motor unit arranged to be held by hand and having in its lower part a rotatable driver for rotation at high speed. A mixing foot is mounted on the said lower part of the motor unit and encloses a vertical shaft, the upper end of the shaft being coupled to the said driver. The lower end of the shaft carries a mixing screw located under a cover provided at the lower end of the foot.

Such known mixers are mainly used for preparing vegetable soups. For this purpose, after the vegetables have been cooked in water, the soup is homogenised by operating the mixer directly for a few moments in the cooking vessel. During this operation particles of vegetables immersed in the water are brought in contact with the mixing screw and are thus crushed.

Known mixers of this type are often dangerous because it is possible to rotate the screw outside the liquid and the user can then inadvertently bring his fingers into contact with the rotating screw.

To avoid this danger, it has been proposed to extend the lateral wall of the cover downwardly to form a protective guard around the screw, and to make in this lateral wall recesses which will allow the vegetables to come into contact with the mixing screw. However, if the recesses are too narrow, some pieces of vegetables will be too bulky to pass through these recesses. On the other hand, if these recesses are wide enough to allow practically all pieces of vegetables to pass through, they will also permit too free an access to the screw and the danger reappears. For example, it is customary to reduce the protective guard to two or three appendages which are spaced peripherally from one another and which at the same time constitute supports arranged to rest against the bottom of the vessel containing the liquid and to ensure thereby that the screw is spaced from this bottom it will be appreciated that such appendages provide little protection for the fingers of the user.

SUMMARY OF THE PRESENT INVENTION

It is an object of this invention to provide a mixer capable of completely crushing the particles to be crushed whilst providing good protection for the user.

According to the present invention there is provided a domestic mixer for use in a liquid, comprising a motor unit arranged to be held by hand, a rotatable driver fixed in the motor unit, a mixing foot extending from the motor unit, and a shaft extending within said mixing foot, one end of said shaft being coupled to the said driver, a mixing screw coupled to the other end of said shaft, and a protective cover at the free end of the foot, wherein said mixing screw is movable between a safety position, in which it is located within the cover and a mixing position in which it projects beyond the cover, elastic restoring means urging said mixing screw into its safety position, said mixing screw being arranged to move against the action of the said restoring means to its mixing position when it rotates in a liquid, this displacement resulting from the screwing effect of the mixing screw in the said liquid.

Thus, when a mixer of the invention is in the working state, that is, is introduced into a liquid, the lateral wall of the cover does not constitute an obstacle to the free circulation of the particles to be crushed, since the screw then projects beyond the cover. When the mixer is out of the liquid, the screw is protected by the lateral wall of the cover surrounding it.

BRIEF DESCRIPTION OF THE DRAWING

An embodiment of the present invention will hereinafter be described, by way of example, with reference to the accompanying drawing, in which:

FIG. 1 shows, partially in elevation and partially in cross-section, a mixer of the invention having a screw which is shown in the safety position; and FIG. 2 is a view similar to FIG. 1 but showing the screw in the mixing position.

DESCRIPTION OF A PREFERRED EMBODIMENT

The mixer illustrated comprises a motor unit 10 designed to be held in the hand and having in its lower part a rotary driver 12 for rotation at high speed. A mixing foot 14 is removably mounted on the lower part of the motor unit 10 and encloses a vertical shaft 16, the upper end 18 of which is coupled to the driver 12. The lower end 20 of the shaft 16 carries a mixing screw 22 which is fixed to the shaft and which is located under a protective cover 24 provided at the lower end of the foot 14.

The protective cover 24 has a lateral wall 26 and a series of recesses 28 in the form of notches are cut out of the lower edge of this wall 26 and distributed over the periphery thereof. This lateral wall carries on its edge at least two downwardly directed extensions 30 which are spaced peripherally from one another. It will be seen that the peripheral space between these extensions 30 is considerably greater than the peripheral width of each of the notches 28.

The shaft 16 is rotatably coupled to the driver 12 by means of a sleeve joint which allows axial play of the shaft 16 relative to the driver 12. This sleeve joint is provided by two diametrically opposite axial grooves 32 in the driver 12 and two lugs 34 on the shaft 16 which are arranged to engage freely in the grooves 32.

The assembly formed by the shaft 16 and the screw 22 is mounted in the foot 14 and is movable between an upper, safety position shown in FIG. 1 and a lower, mixing position shown in FIG. 2. In the upper, safety position, the screw 22 is located in the space within the cover 24, and the assembly is stressed towards this safety position by elastic restoring means 36 within the foot 14. In the lower, mixing position the screw 22 has been moved downwardly out of the cover 24. The assembly of the shaft 16 and the screw 22 moves automatically into the mixing position against the action of the restoring means 36 when the screw 22 rotates in a liquid, this displacement resulting from the effect of the screwing of the screw in the liquid.

The restoring means 36 consists of a helical spring coaxial to the shaft 16 and located between a fixed seat 38 made in the foot 14 and a movable seat 40 carried on the shaft 16. A sleeve 42 is located between the spring 36 and the shaft 16, the lower end of which, and in the lower position shown in FIG. 2, the sleeve 42 rests against the seat 38, with an anti-friction washer 44 interposed, such that the seat 38 and sleeve 42 define the lower limit of the axial displacement of the shaft 16.

It will be seen that the extensions 30 of the lateral wall 26 of the cover extend downwardly beyond the screw 22 in the lower mixing position. These extensions provide supports designed to rest against the bottom of a vessel containing the liquid and ensure that the screw is suitably spaced from the bottom of the vessel during mixing.

It will be understood that, when the mixer is out of the liquid (FIG. 1), the screw 22 is protected laterally by the lateral wall 26 formed by the series of closely spaced teeth defined between the recesses 28. Thus, if the user starts up the mixer, there is very little risk that he will inadvertently bring his hand into contact with the screw.

When the mixer is in the working state, that is to say introduced into the liquid, the screw 22 is located at a level lower than the teeth of the wall 26. The largest pieces of vegetables can pass freely between the extensions 30 so as to reach this screw. The smallest particles can pass either through the notches 28 or between the extensions 30.

I claim:

1. A domestic mixer for use in a liquid, comprising a motor unit arranged to be held by hand, a rotatable driver fixed in the motor unit, a mixing foot extending from the motor unit, and a shaft extending within said mixing foot, one end of said shaft being coupled to the said driver, a mixing screw coupled to the other end of said shaft, and a protective cover at the free end of the foot, wherein said mixing screw is movable between a safety position, in which it is located within the cover and a mixing position in which it projects beyond the cover, elastic restoring means urging said mixing screw into its safety position, said mixing screw being arranged to move against the action of the said restoring means to its mixing position when it rotates in a liquid, this displacement resulting from the screwing effect of the mixing screw in the said liquid.

2. A mixer according to claim 1, wherein the mixing screw is fixed to said other end of the shaft, and a sleeve joint rotatably couples said one end of the shaft to the driver, said sleeve joint enabling axial play of the shaft relative to the driver, and the said shaft being movable within the foot between two positions in which the mixing screw occupies respectively its safety position and its mixing position.

3. A mixer according to claim 2, wherein the elastic restoring means consists of a helical spring coaxial with the shaft, and wherein a first seat is located in the foot and a second seat is located on the shaft, said helical spring being located between said first and second seats.

4. A mixer according to claim 1, wherein extensions are carried on the edge of the cover, said extensions being peripherally spaced from one another and extending beyond the mixing screw when it is in its mixing position, the said extensions being arranged to rest against the bottom of a vessel containing the liquid to thereby ensure that the mixing screw is spaced from the said bottom during mixing.

5. A mixer according to claim 4, wherein recesses are formed in said cover and distributed over its periphery, the peripheral space between said extensions being considerably greater than the peripheral width of the said recesses.

* * * * *